(12) United States Patent
Keane et al.

(10) Patent No.: US 7,959,164 B2
(45) Date of Patent: Jun. 14, 2011

(54) ROLL CONTROL DEVICES

(75) Inventors: James Keane, West Bloomfield, MI (US); Simon Dean, West Bloomfield, MI (US); Edward H. Phillips, Troy, MI (US); Eric Smay, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 175 days.

(21) Appl. No.: 12/194,703

(22) Filed: Aug. 20, 2008

(65) Prior Publication Data

US 2008/0309032 A1    Dec. 18, 2008

Related U.S. Application Data

(63) Continuation-in-part of application No. PCT/US2008/050082, filed on Jan. 3, 2008.

(60) Provisional application No. 60/896,598, filed on Mar. 23, 2007.

(51) Int. Cl.
*B60G 17/00* (2006.01)

(52) U.S. Cl. ............... 280/5.508; 280/5.509; 280/5.511; 280/124.106; 280/124.157; 280/124.16; 280/124.161

(58) Field of Classification Search ............... 280/5.501, 280/5.502, 5.506, 5.508, 5.509, 5.511, 5.513, 280/124.106, 124.157, 5.507, 124.161, 124.16
See application file for complete search history.

(56) References Cited

U.S. PATENT DOCUMENTS

| | | | | |
|---|---|---|---|---|
| 4,589,675 A | * | 5/1986 | Braun et al. | 280/6.159 |
| 5,020,826 A | * | 6/1991 | Stecklein et al. | 280/124.159 |
| 5,044,662 A | * | 9/1991 | Kawabata | 280/5.501 |
| 5,087,072 A | * | 2/1992 | Kawarasaki | 280/5.503 |
| 5,599,073 A | * | 2/1997 | Huh | 303/3 |
| 5,682,980 A | * | 11/1997 | Reybrouck | 280/5.504 |
| 5,735,540 A | | 4/1998 | Schiffler | |
| 6,039,326 A | * | 3/2000 | Agner | 280/5.506 |
| 6,152,254 A | * | 11/2000 | Phillips | 180/422 |
| 6,520,510 B1 | * | 2/2003 | Germain et al. | 280/5.511 |
| 6,575,484 B2 | * | 6/2003 | Rogala et al. | 280/124.158 |
| 6,669,216 B1 | * | 12/2003 | Elser et al. | 280/124.106 |
| 6,871,866 B2 | * | 3/2005 | Gloceri et al. | 280/124.154 |

(Continued)

FOREIGN PATENT DOCUMENTS

DE    4337765    5/1995

(Continued)

OTHER PUBLICATIONS

Dirk Nissing, Control system for an active suspension stabilization, Aug. 10, 2005, EPO, English machine translation of Specification.*

(Continued)

*Primary Examiner* — Paul N Dickson
*Assistant Examiner* — James English
(74) *Attorney, Agent, or Firm* — Carlson, Gaskey & Olds, PC (57) ABSTRACT

An example roll control device uses differential pressure values, for example, that are conveyed by a motor driven pump to a first actuator associated with a first stabilizer. The differential pressure values are also conveyed from the motor driven pump to a second stabilizer through a proportional valve in one example. In another example, multiple actuators are utilized with each actuator being associated with a separate motor driven pump in communication with a common controller.

17 Claims, 7 Drawing Sheets

U.S. PATENT DOCUMENTS

| | | | |
|---|---|---|---|
| 6,886,837 B2 * | 5/2005 | Gibbs | 280/43.17 |
| 6,948,580 B2 * | 9/2005 | Scholten et al. | 180/89.14 |
| 7,429,050 B2 * | 9/2008 | Amano | 280/5.507 |
| 7,600,770 B2 * | 10/2009 | Walentowski | 280/124.13 |
| 2003/0047898 A1 * | 3/2003 | Nagy et al. | 280/124.157 |
| 2005/0209750 A1 * | 9/2005 | Masamura et al. | 701/38 |
| 2005/0225048 A1 * | 10/2005 | Kasamatsu | 280/124.16 |
| 2005/0280237 A1 * | 12/2005 | Stacey et al. | 280/124.16 |
| 2006/0255550 A1 * | 11/2006 | Pfeil et al. | 280/5.509 |
| 2007/0170680 A1 * | 7/2007 | Knaap | 280/124.106 |
| 2008/0012262 A1 * | 1/2008 | Carabelli et al. | 280/124.106 |
| 2008/0309031 A1 * | 12/2008 | Hall et al. | 280/5.508 |

FOREIGN PATENT DOCUMENTS

| | | |
|---|---|---|
| DE | 10009918 | 9/2001 |
| DE | 10360231 | 7/2005 |
| EP | 1426209 | 6/2004 |
| EP | 1561614 A1 * | 8/2005 |
| EP | 1609636 | 12/2005 |
| GB | 2356609 | 5/2001 |
| GB | 2393160 | 3/2004 |
| JP | 2000264034 | 9/2000 |
| WO | 2006097784 | 9/2006 |
| WO | 2006097853 | 9/2006 |

OTHER PUBLICATIONS

International Search Report and Written Opinion dated Jun. 16, 2008.
International Preliminary Report on Patentability dated Oct. 8, 2009 from corresponding PCT/US2008/050082.

* cited by examiner

UTILIZE A ROLL CONTROL DEVICE 10 OR 40 ON A VEHICLE TO CONTROL ITS UNDER- OR OVER-STEER CHARACTERISTICS VIA MANIPULATION OF A STABILIZER ASSOCIATED WITH EITHER OF THE AXLES OF A VEHICLE

ROLL CONTROL DEVICES

RELATED APPLICATIONS

This application is a continuation-in-part application that claims priority to PCT/US2008/050082 filed on Jan. 3, 2008, which claims priority to U.S. Provisional Application No. 60/896,598, which was filed on Mar. 23, 2007.

BACKGROUND OF THE INVENTION

This disclosure relates generally to stabilizers for vehicle suspension systems, and more particularly to a method and system for controlling roll control actuators.

Hydraulically actuated roll control systems for selectively controlling roll characteristics of vehicle suspension systems are known. One such system was disclosed in U.S. Pat. No. 3,197,233. That system utilized a roll control actuator hydromechanically coupling first and second (e.g., left and right) torsion bars. The roll control actuator comprised a rotary hydraulic cylinder including a cylindrical housing having two radially oriented ribs projecting into a cylindrical space of a housing. A vane-type swinging piston has two vanes, and the ribs and vanes separate the cylindrical space into four chambers.

A different type of roll control actuator was disclosed in U.S. Pat. No. 6,361,033. As opposed to a rotary hydraulic cylinder, the roll control actuator comprised an axially moving piston driving an internally disposed annular member having an internal ball spline. The ball spline couples to a first torsion bar and an external large helix angle ball screw, which couples to a second torsion bar. Axial thrust imposed upon the annular member results in torque being imposed between the first and second torsion bars.

Simplified controls of prior art roll control actuators are not well developed. For example, one type of roll control device is unnecessarily complex in that it utilizes two proportional solenoid controlled valves for controlling differential pressure values in front and rear stabilizer roll control actuators. Two solenoid controlled valves are also used with one of them having seven ports. Furthermore, a roll control device using proportional solenoid controlled valves that are open center valves, relies upon continuous fluid flow derived from a compound engine driven power steering pump, which is not desired.

What is needed is a simplified roll control device having improved performance characteristics. A more direct electronic control is also desired.

SUMMARY OF THE INVENTION

A roll control device is disclosed that includes at least one actuator having first and second chambers. A pump is fluidly connected between the first and second chambers, and a motor is connected to the pump. A controller is in communication with the motor and is configured to command the motor to drive the pump in response to a desired roll stability signal. The pump transfers fluid between the first and second chambers to change a differential roll force associated with at least one of the first and second chambers.

In one example, multiple actuators are utilized with each actuator being associated with a separate motor driven pump in communication with a common controller.

These and other features of the disclosure can be best understood from the following specification and drawings, the following of which is a brief description.

DETAILED DESCRIPTION OF THE PREFERRED EMBODIMENT

Figure 1:
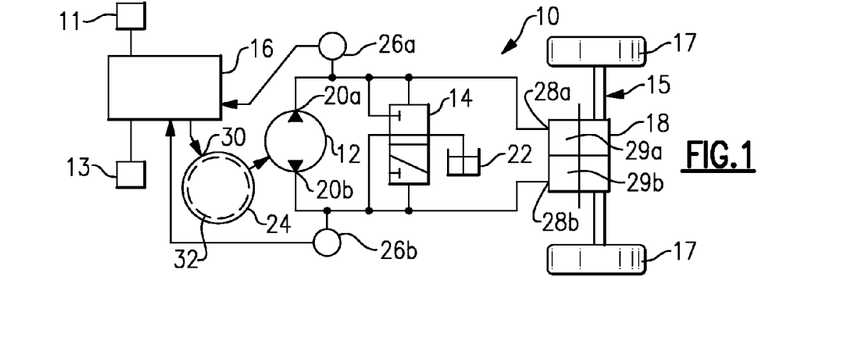
FIG. 1 is a schematic view representative of a first example roll control device.

With reference to FIG. 1, a first example roll control device 10 includes a motor driven pump 12 and a three-way shuttle valve 14, for example, that are utilized in conjunction with a controller 16 for controlling a roll control actuator 18. In one example, the motor driving the pump is a servomotor. One or more inputs 11 are in communication with the controller 16. The inputs 11 can include vehicle speed, wheel angle and other parameters that contribute to vehicle stability. The controller 16 includes one or more algorithms that determine a desired roll stability based upon the inputs 11. The controller 16 commands the motor using a desired roll stability signal to achieve a desired force, pressure or torque within the device that corresponds to the desired roll stability.

The roll control actuator 18 cooperates with a roll control stabilizer 15 provided between wheels 17 of a vehicle. For example, the roll control stabilizer is a stabilizer bar interconnected between control arms that support spindles to which the wheels 17 are mounted. It should be understood, however, that the roll control configurations illustrated in the Figures are exemplary. That is, this application can be applied to other hydraulic roll control configurations, for example, linear actuators, rotary actuators, ball screw devices, etc., and still fall within the scope of the present claims.

The pump 12 and three-way shuttle valve 14 are positioned with the three-way shuttle valve 14 fluidly coupling the output port 20*a* or 20*b* of the pump 12 to a reservoir 22 in one of the positions of the three-way shuttle valve. The fluid connections associated with each position of the valves are schematically illustrated. The three-way shuttle valve 14 includes a first position (shown) in which the output port 20*a* is blocked and output 20*b* communicates with the reservoir 22. In a second position, the output port 20*b* is blocked and output port 20*a* communicates with the reservoir.

A roll sensor 13 is in communication with the controller 16 and senses a roll condition for which a roll signal is sent to the controller 16, thus providing feedback for the device 10. The controller 16 controls the motor 24 to drive the pump 12, which in turn moves fluid between actuator chambers. This generates a differential pressure (torque) when pumped against a resistive force. In one example, the motor 24 is a reversible servomotor. If more precise control of the differential pressure is desired, first and second pressure transducers 26*a* and 26*b*, also depicted in FIG. 1, are fluidly coupled to the output ports 20*a* and 20*b* of the pump 12 wherefrom feedback pressure signals are issued to the controller 16. The controller 16 then controls the motor 24 and the pump 12 for providing desired differential pressure to the roll control actuator 18 in a closed-loop controlled manner.

In operation, the controller 16 issues a command or controlling signal to the motor 24 to drive the pump 12, which continuously provides fluid at instantly desired differential pressure values, for example, to the ports 28*a* and 28*b* of the roll control actuator 18. The ports 28*a*, 28*b* are associated with first and second chambers 29*a*, 29*b* of the actuator 18. The differential pressure transfers fluid between the first and second chambers 29*a*, 29*b* to increase the differential roll force at one wheel relative to the other wheel.

Figure 2:
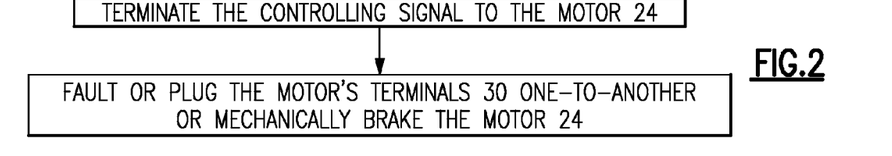
FIG. 2 is a flow chart depicting a method of providing failsafe operation for the first example roll control device.

Referring to FIG. 2, failsafe conditions are implemented by the controller 16, for example, via deactivating the controlling signal to the motor 24 and either implementing a faulting or "plugging" of the motor's terminals 30 one-to-another or mechanically braking the motor 24 via a failsafe brake 32 (shown in FIG. 1), whereby no fluid can be pumped from the pump 12. When a failsafe condition has been initiated, the roll control actuator 18 is substantially hydrostatically locked in its instant position with the result that the stabilizer 15 operates as a standard torsion bar implemented stabilizer, for example.

Figure 3:
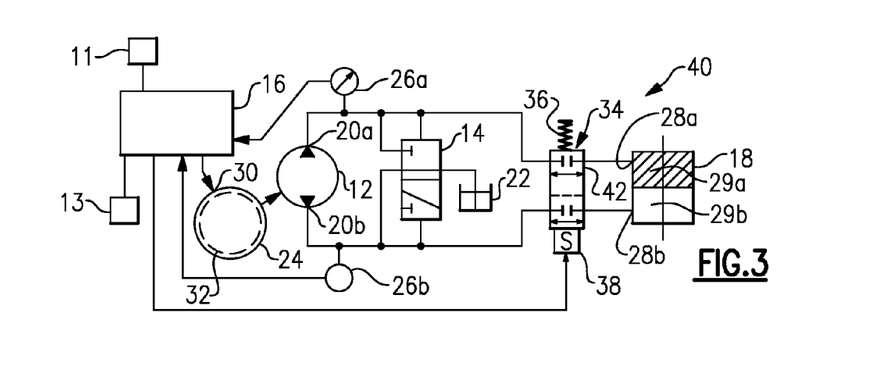
FIG. 3 is a schematic view representative of a second example roll control device.

With reference to FIG. 3, a second example roll control device 40 incorporates a normally closed failsafe valve 42 that is utilized in conjunction with the pump 12, three-way shuttle valve 14, and controller 16 for controlling the roll control actuator 18. The stabilizer 15 and wheels 17 are not shown. The failsafe valve 42 is arranged between the three-way shuttle valve 14 and the roll control actuator 18, for example. The failsafe valve 42 includes a valve 34 biased to the normally closed position by a spring 36, for example. The failsafe valve 42 delivers fluid to the roll control actuator 18 at the controlled pressure determined by instant polarity and values of torque delivered by the motor 24, for example. The pump 12 can transfer fluid between the first and second chambers 29*a*, 29*b* once a command signal from the controller 16 is sent to a solenoid 38, which moves the valve 34 from the normally closed position to an open position (shown in FIG. 3), thus overcoming the spring 36.

Figure 4:
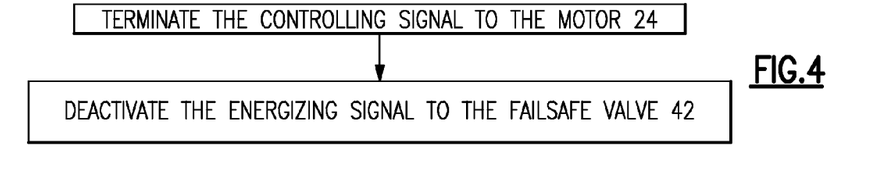
FIG. 4 is a flow chart depicting a method of providing failsafe operation for the second example roll control device.

In one example mode of operation shown in FIG. 4, failsafe conditions are implemented by the controller 16 via deactivating the controlling signal to the pump 12 and the energizing signal to the failsafe valve 42 whereby no fluid is pumped from the pump 12. In the example, the roll control actuator 18 is additionally substantially hydrostatically locked in its instant position with the result that the stabilizer operates as a standard torsion bar implemented stabilizer.

Figure 5:
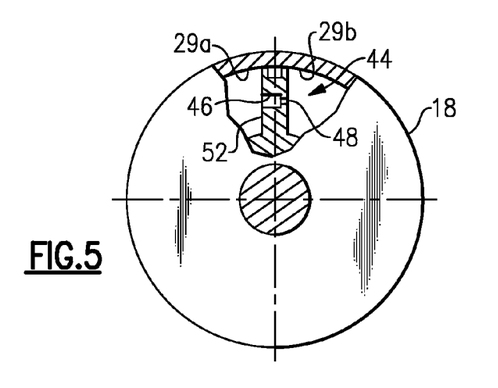
FIG. 5 is a cross-sectional view of a roll control actuator centering device.

One potential drawback of the failsafe shutdown procedure described above is that it could be activated at any time, such as during a period where a large differential pressure exists. As a result, the shutdown procedure could result in the vehicle assuming a permanent roll or "tilted" position when the maneuver that caused the large differential pressure is terminated. As shown schematically in FIG. 5, this can be eliminated by providing a roll control actuator centering device 44 comprising a passage 46 and orifice 48 fluidly connecting first and second chambers 29*a* and 29*b* of the roll control actuator 18. The passage 46 and orifice 48 are formed in one of the vanes 52 of the roll control actuator 18, as depicted in the example illustrated in FIG. 5.

Figure 6:
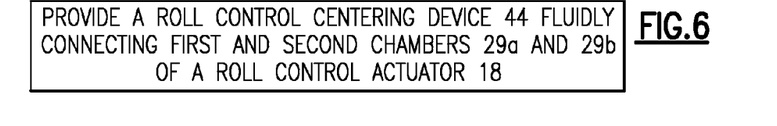
FIG. 6 is a flow chart depicting a method of providing controlled leak down of non-zero differential pressure that may occur following a failsafe condition.

Such a roll control actuator centering device 44 could be provided between the "failsafe" solution and the actuator 18, or in the actuator 18. Either of these configurations releases differential pressure, and thus torque, so the centering device is located on the an actuator side of the hydraulic circuit when the failsafe is activated, i.e. closed. The example arrangement permits any non-zero differential pressure between the first and second chambers 29*a*, 29*b* to equalize gradually, but not so fast that any substantial leak down would be likely to occur within any expected vehicle maneuver, the method of which is illustrated in FIG. 6. The orifice will be relatively small to prevent substantial leakage. Optionally, the orifice could be spring checked to that leakage would only occur over a certain threshold or during road load inputs. The example roll control actuator centering device 44 may be utilized in other arrangements of roll control devices. A vehicle can thus gradually assume a non-roll condition in conjunction with continuing utilization of a stabilizer or stabilizers operating in the manner of a standard torsion bar implemented stabilizer or stabilizers.

Figure 7:
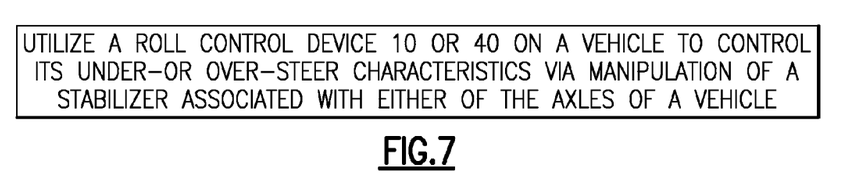
FIG. 7 is a flow chart depicting a method of controlling under or over steer characteristics of a vehicle.

A single roll control device 10 or 40 on a vehicle enables control of under- or over-steer characteristics via manipulation of a stabilizer (shown schematically at 15 in FIG. 1) associated with either of the wheels (shown at 17 in FIG. 1) of a vehicle. With reference to FIG. 7, a flow chart depicting a method of controlling under- or over-steer characteristics of a vehicle. The method includes utilizing a single roll control device 10 or 40 on a vehicle to control it's under or over steer characteristics via manipulation of a stabilizer associated with either of the axles or wheels of a vehicle.

In the case of a performance-oriented vehicle it may be desirable to provide two roll control devices 10 for controlling the vehicle's overall roll characteristics. A third example roll control device 60 is shown FIG. 8 in which active control stabilizers associated with both front and rear wheels of a vehicle can be implemented. In the roll control device 60, a reservoir 22, a pump 12, and a three-way shuttle valve 14 are utilized in conjunction with a controller 16 for controlling a first roll control actuator 18 as described above with reference to the first roll control device 10. In addition however, the third example roll control device 60 also includes a proportional valve 62 that is fluidly connected to and draws hydraulic power from the output ports 20*a* and 20*b* of the pump 12.

Figure 8:
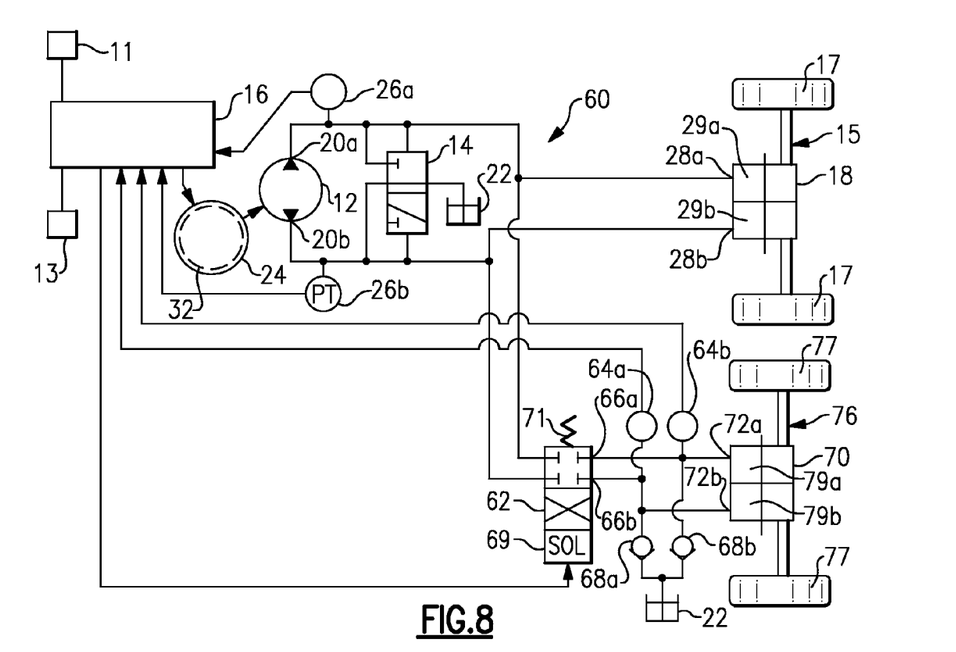
FIG. 8 is a schematic view representative of a third example roll control device.

In the example shown in FIG. 8, two pressure transducers 64*a* and 64*b* are used in a similar fashion to the optional pressure transducers 26*a* and 26*b*. In the present example, the pressure transducers 64*a*, 64*b* are fluidly coupled to output ports 66*a* and 66*b* of the proportional valve 62. Two check valves 68*a* and 68*b* are used for fluidly coupling the reservoir 22 to the ports 66*a* or 66*b* of the proportional valve 62 in the event that output ports 66*a* or 66*b* would otherwise be subject to a pressure value less than that of the reservoir 22. The proportional valve 62 includes a solenoid 69 in communication with the controller 16. The proportional valve 62 is normally biased to a closed position (shown in FIG. 8) by a spring 71. The proportional valve 62 and pressure transducers 64a and 64b are utilized in conjunction with the controller 16 for controlling the flow and pressure of fluid in a second roll control actuator 70, i.e. controlling torque in the second roll control actuator 70, where the second roll control actuator 70 is associated with a second roll control stabilizer 76 for a second set of wheels 77 on the vehicle. The controller 16 commands the solenoid 69 to open the proportional valve 62 to throttle flow via the proportional valve 62 so that roll couple distribution between front an rear stabilizer bars can be changed.

Generally, the controller 16 issues a controlling signal to the motor 24 that causes it to continuously provide fluid through pump 12 at instantly desired differential pressure values to the ports 28a and 28b of the first roll control actuator 18 in the manner described above with reference to the first control device 10. A closed-loop controlling signal is sent to the proportional valve 62 in response to the algebraic sum of feedback signals issuing from the pressure transducers 64a and 64b, for example, and thereby continuously provides fluid at instantly desired differential pressure values to ports 72a and 72b of the second roll control actuator 70. In this case however, the differential pressure values provided to ports 72a and 72b are limited to differential pressure values less than or equal to the differential pressure values from the pump 12. Thus in general, the vehicle and first and second roll control actuators 18, 70 are configured such that the operating pressure values of the second roll control actuator 70 are less that those of the first roll control actuator 18.

Figure 9:
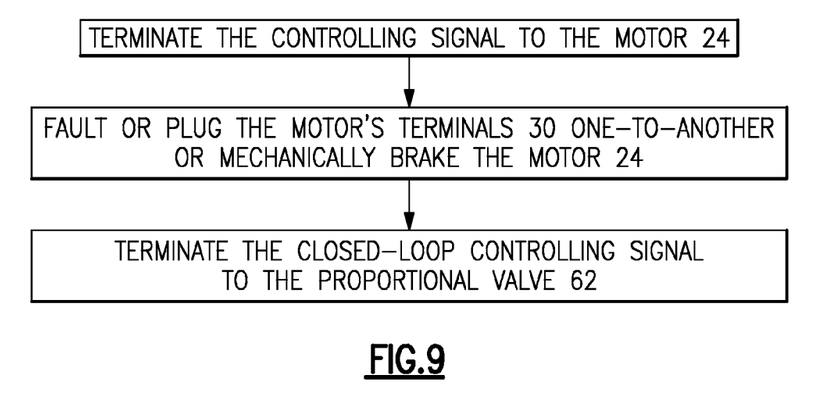
FIG. 9 is a flow chart depicting a method of providing failsafe operation for the third example roll control device.

With reference to FIG. 9, there is shown a flow chart depicting a method of providing failsafe operation for the third roll control device 60. The method includes terminating the controlling signal to the motor 24, faulting or plugging of the motor's terminals 30 one-to-another or mechanically braking the motor 24. The closed-loop controlling signal to the proportional valve 62 is terminated. The pump 12 ceases delivery of fluid and the first and second roll control actuator 18 and 70 are substantially hydrostatically locked together.

Figure 10:
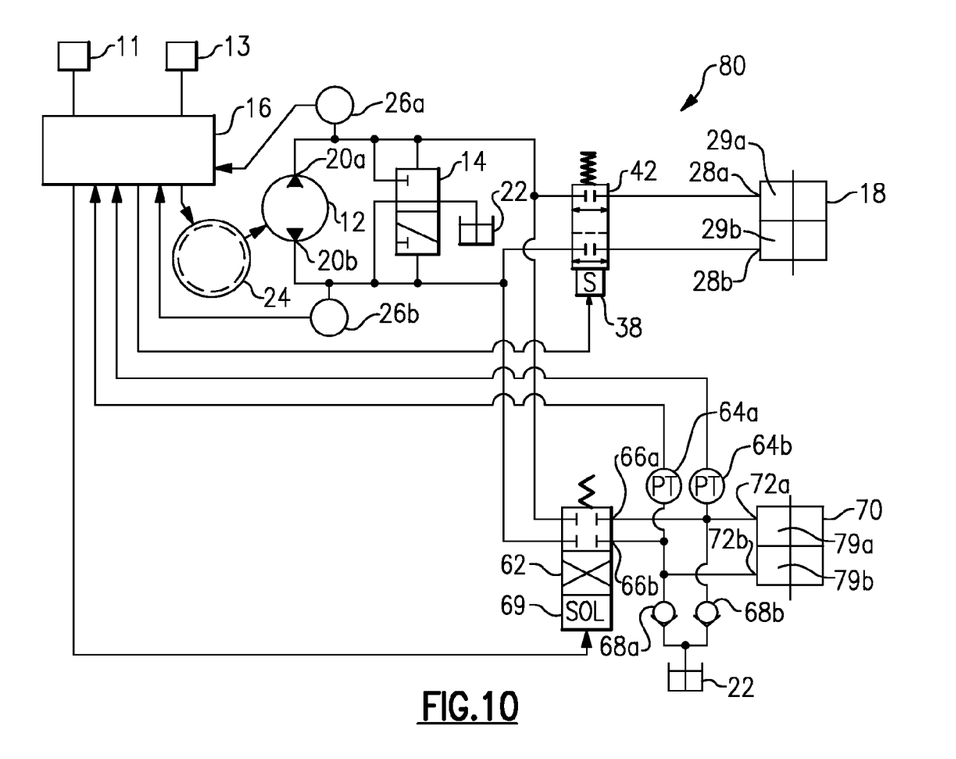
FIG. 10 is a schematic view representative of a fourth example roll control device.

With reference to FIG. 10, a fourth example roll control device 80 is shown in which active control stabilizers associated with both stabilizers 15, 76 of a vehicle can be implemented. The roll control device 80 uses a reservoir 22, a pump 12, a three-way shuttle valve 14, and a failsafe valve 42 in conjunction with a controller 16 for controlling a first roll control actuator 18 in the same manner as explained above with reference to the second roll control device 40. In addition however, the fourth roll control device 80 again includes a proportional valve 62 that is positioned in parallel with the failsafe valve 42. The proportional valve 62 is also fluidly connected to and draws hydraulic power from the output ports 20a and 20b of the pump 12.

Generally, the controller 16 issues an energizing signal to the solenoid 38 of the failsafe valve 42 whereby it moves to its open condition. A command is sent to the motor 24 that causes the pump 12 to continuously provide fluid at instantly desired differential pressure values to the ports 28a and 28b of the first roll control actuator 18 in the manner described above with reference to the second roll control device 40. A closed-loop controlling signal is sent to the solenoid 69 of the proportional valve 62 in response to the algebraic sum of feedback signals issuing from the pressure transducers 64a and 64b. Fluid is continuously provided at instantly desired differential pressure values to ports 72a and 72b of the second roll control actuator 70. Again in this case however, the differential pressure values provided to ports 72a and 72b are limited to differential pressure values less than or equal to the differential pressure values issuing from the pump 12.

Failsafe conditions with respect to the first roll control actuator 18 are implemented by the controller 16 to deactivate the controlling signal to the motor 24 and to the failsafe valve 42 whereby no fluid is pumped from the pump 12. As a result, the first roll control actuator 18 is substantially hydrostatically locked in its instant position and the first stabilizer again operates as a standard torsion bar implemented stabilizer. Again, presuming that the first stabilizer is utilized in conjunction with the front axle, the vehicle may then be rendered in an under-steering manner because the second roll control actuator 70 is constrained only in accordance with the failsafe position of the proportional valve 62. If the under-steering attitude is desired, then the proportional valve 62 is configured in the open position when the controller 16 deactivates the closed-loop controlling signal to the solenoid 69, the second roll control actuator 70 is free to back drive fluid through the pump 12. If under-steering is not desired, the proportional valve 62 is configured in the closed position whereby the second roll control actuator 70 is substantially hydrostatically locked when the controller 16 deactivates the closed loop controlling signal.

Figure 11:
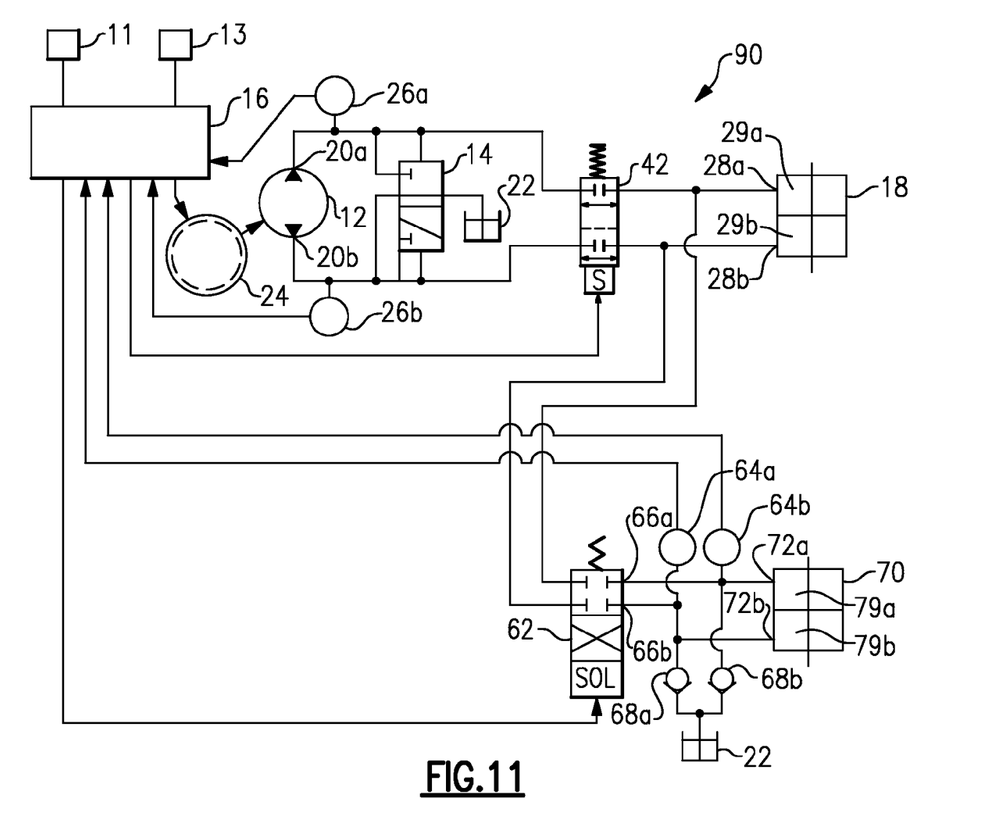
FIG. 11 is a schematic view representative of a fifth example roll control device.

With reference now to FIG. 11, there shown is a fifth example roll control device 90, in which the proportional valve 62 is in series with the failsafe valve 42 and drawing hydraulic power therefrom. The stabilizers 15, 76 are not shown. In operation, the controller 16 issues an energizing signal to the failsafe valve 42 whereby it moves to its open condition. A controlling signal is sent to the motor 24 that causes the pump 12 to continuously provide fluid at instantly desired differential pressure values to the ports 28a and 28b of the first roll control actuator 18 in the manner described above with reference to the second and fourth roll control devices 40 and 80. The controller 16 issues a closed-loop controlling signal to the solenoid 69 of the proportional valve 62 in response to the algebraic sum of feedback signals issuing from the pressure transducers 64a and 64b and thereby continuously provides fluid at instantly desired differential pressure values to ports 72a and 72b of the second roll control actuator 70. The differential pressure values provided to ports 72a and 72b are limited to differential pressure values less than or equal to the differential pressure values issuing from the pump 12. The fifth roll control device 90 differs operatively from the fourth roll control device 80 in that its failsafe mode of operation precludes the above noted under-steering condition because the failsafe valve 42 causes the first and second roll control actuators 18 and 70 to be substantially hydrostatically locked together whenever the controller 16 deactivates the controlling signal. However, both roll control actuators 18 and 70 can be individually substantially hydrostatically locked by additionally configuring the proportional valve 62 in the closed position to prevent transfer of fluid between the roll control actuators 18 and 70 when the controller 16 additionally deactivates the closed-loop controlling signal.

Figure 16:
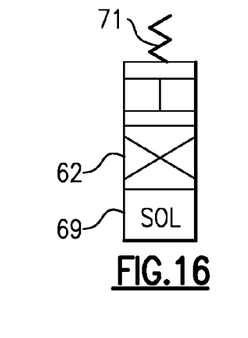
FIG. 16 is a schematic representation of an alternate proportional valve configuration.
Figure 17:
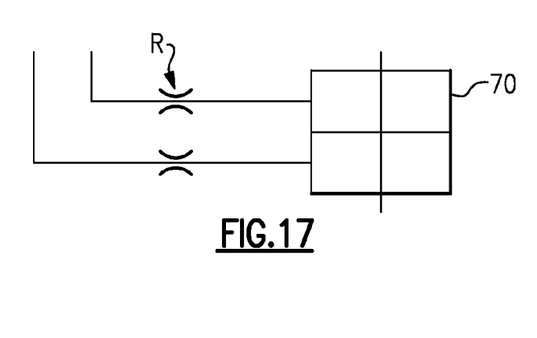
FIG. 17 is a schematic representation showing the proportional valve being replaced by an orifice restriction.

The proportional valve 62 can take on various configurations. The proportional valve 2 of FIGS. 8, 10, and 11 is shown closed and hydraulically locked for a failsafe condition. The proportional valve 62 also includes a variable orifice. Optionally, the proportional valve 62 could be configured as shown in FIG. 16 with a variable orifice and open circuit for a failsafe condition to allow fluid flow to prevent vehicle stability problems as discussed above. Or, the proportional valve 62 could be replaced with a no-valve configuration as shown in FIG. 17. In this configuration, an orifice restriction R of a constant restricted diameter is associated with the second roll control actuator 70 for fixed roll couple distribution. Variable orifice configurations can vary from a no flow condition to a greater than or equal to front flow configuration.

Figure 12:
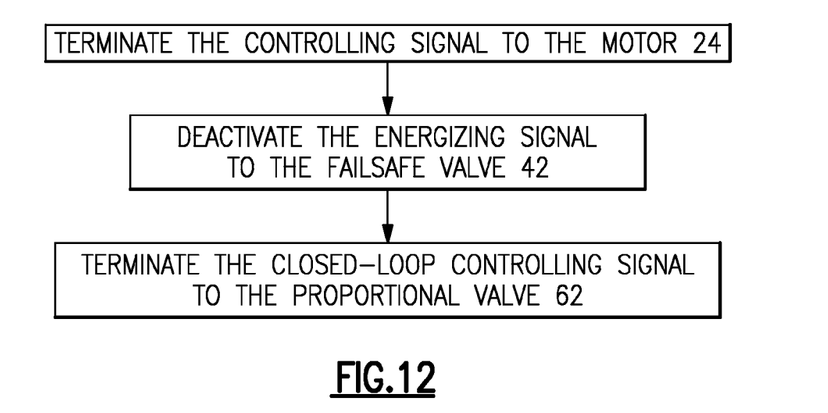
FIG. 12 is a flow chart depicting a method of providing failsafe operation for either of the fourth and fifth example roll control devices.

With reference to FIG. 12, there shown is a flow chart depicting a method that includes terminating the controlling signal to the motor 24. The signals to the failsafe valve 42 and the proportional valve 62 are terminated. The pump 12 ceases delivery of fluid. The first and second roll control actuators 18 and 70 are substantially hydrostatically locked together.

Figure 13:
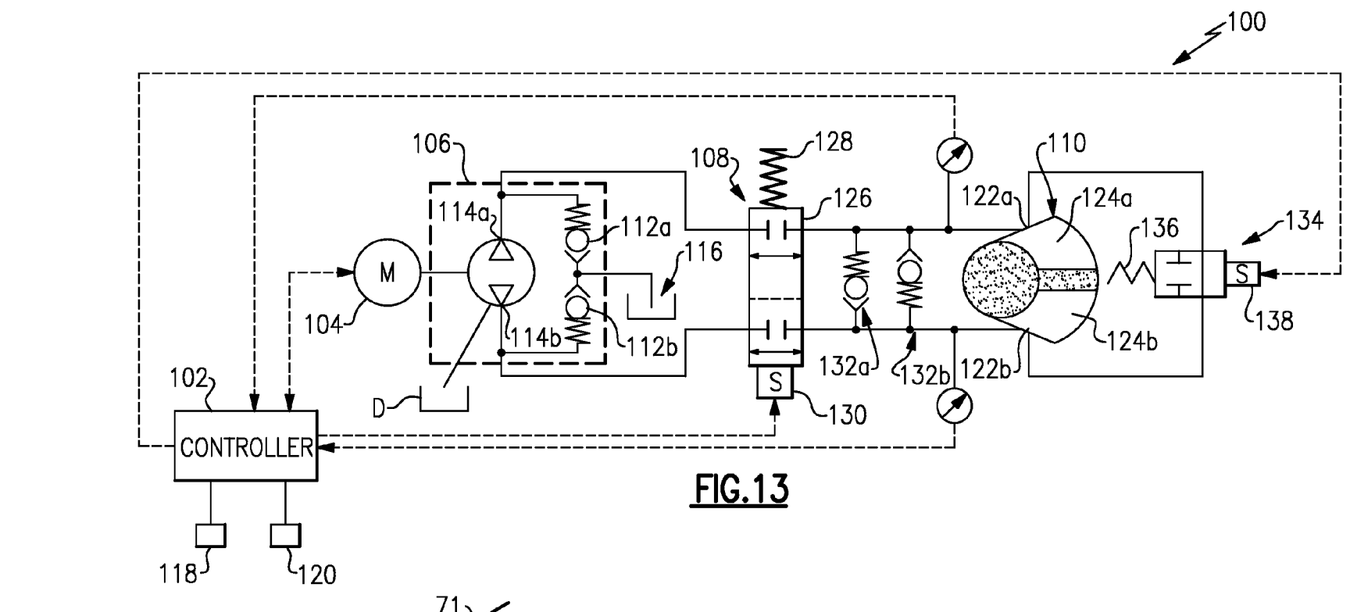
FIG. 13 is a schematic view representative of a sixth example roll control device.

FIG. 13 discloses an active roll control device 100 that is for a single axle bi-directional servo pump and rotary actuator configuration. The bi-directional servo pump could also be connected to a linear actuator, or could be used for a single wheel instead of an entire axle. The roll control device 100 includes a controller 102, a servo motor 104, a bi-directional pump 106, a failsafe valve 108, and an actuator 110. The bi-directional pump 106 includes valves 112a, 112b that are respectively associated with output ports 114a, 114b of the pump 106, and which are connected to a reservoir 116. The pump 106 also includes a case drain D. The drain D acts as a control orifice that allows expanding fluid due to temperature increases to bleed back into the reservoir. The pump 106, valves 112a, 112b, and servo motor 104 are utilized in conjunction with the controller 102 to control roll stability via the actuator 110.

One or more inputs 118 are in communication with the controller 102. As discussed above, the inputs 118 can include vehicle speed, wheel angle and other parameters that contribute to vehicle stability. The controller 102 includes one or more algorithms that determine a desired roll stability based upon the inputs 118. The controller 102 commands the motor 104 using a desired roll stability signal to achieve a desired force, pressure or torque within the device that corresponds to the desired roll stability.

The actuator 110 cooperates with a roll control stabilizer, such as a stabilizer bar for example, provided between wheels of a vehicle as discussed above. The pump 106 and valves 112a, 112b fluidly couple the output ports 114a or 114b of the pump 106 to the reservoir 116 in one of the different positions as described above. Specifically, valves 112a, 112b can be open or closed based on differential pressure. The purpose of the valves 112a, 112b is to provide reservoir fluid to a back side of the pump 106 to prevent pump cavitation. Generally, ports 114a, 114b are never blocked but may be closed off from the reservoir if the pressure on the particular side of the pump is greater than that of the reservoir.

A roll sensor 120 is in communication with the controller 102 and senses a roll condition for which a roll signal is sent to the controller 102 to provide feedback for the device 100. The controller 102 controls the actuator 110 to achieve a desired vehicle roll stability. More specifically, the pump 106 delivers fluid to the actuator 110 at a controlled differential pressure determined by instant polarity and values of torque, for example, delivered by the motor 104 connected to the pump 106 in response to control thereof by the controller 102. The controller 102 then actively controls the motor 104 and the pump 106 for providing desired differential pressure to the actuator 110 in a closed-loop controlled manner.

In operation, the controller 102 issues a command or controlling signal to the motor 104 to drive the pump 106, which continuously provides fluid at instantly desired differential pressure values, for example, to ports 122a and 122b of the actuator 110. The ports 122a, 122b are associated with first and second chambers 124a, 124b of the actuator 110. The pump 106 transfers fluid between the first and second chambers 124a, 124b and differential pressure (torque) is developed as a result. Because it is torque, the force generated by the system at the wheel is equal and opposite.

The failsafe valve 108 is arranged between the pump 106 and pressure relief valves 132a, 132b and/or the actuator 110. The failsafe valve 108 includes a valve 126 biased to a normally closed position by a spring 128, for example. The pump 106 delivers fluid, and when open, failsafe valve 108 allows passage of the fluid. The pump 106 can transfer fluid between the first and second chambers 124a, 124b once a command signal from the controller 102 is sent to a solenoid 130, which moves the valve 126 from the normally closed position to an open position by overcoming the spring 128.

Additional pressure relief valves 132a, 132b can also be incorporated into the roll control device 100. In one example, the pressure relieve valves are located as close as possible to the actuator to reduce response time to high load events. The pressure relieve valves are associated with the output ports 114a, 114b of the pump 106 and with the ports 122a, 122b of the actuator 110. Also included in the roll control device 100 is a cross-link valve 134 that is biased to a normally closed position by a spring 136. Optionally, this valve 134 could be biased to a normally open position if the vehicle requires it for failsafe reasons.

In one example, the controller 102 sends a command signal to a solenoid 138 which moves the valve 134 from the normally closed position to an open position by overcoming the spring 136. The cross-link valve 134 is fluidly connected to the ports 122a, 122b of the actuator 110. When open, fluid can flow between the chambers 124a, 124b.

In one example, failsafe conditions are implemented by the controller 102 via deactivating the controlling signal to the pump 106 and the energizing signal to the failsafe valve 108 whereby no fluid is pumped from the pump 106. In the example, the actuator 110 is additionally substantially hydrostatically locked in its instant position with the result that the stabilizer operates as a standard torsion bar implemented stabilizer. The cross-link valve 134 could also be used in certain situations to set the differential pressure between chambers 124a, 124b back to zero.

Figure 14:
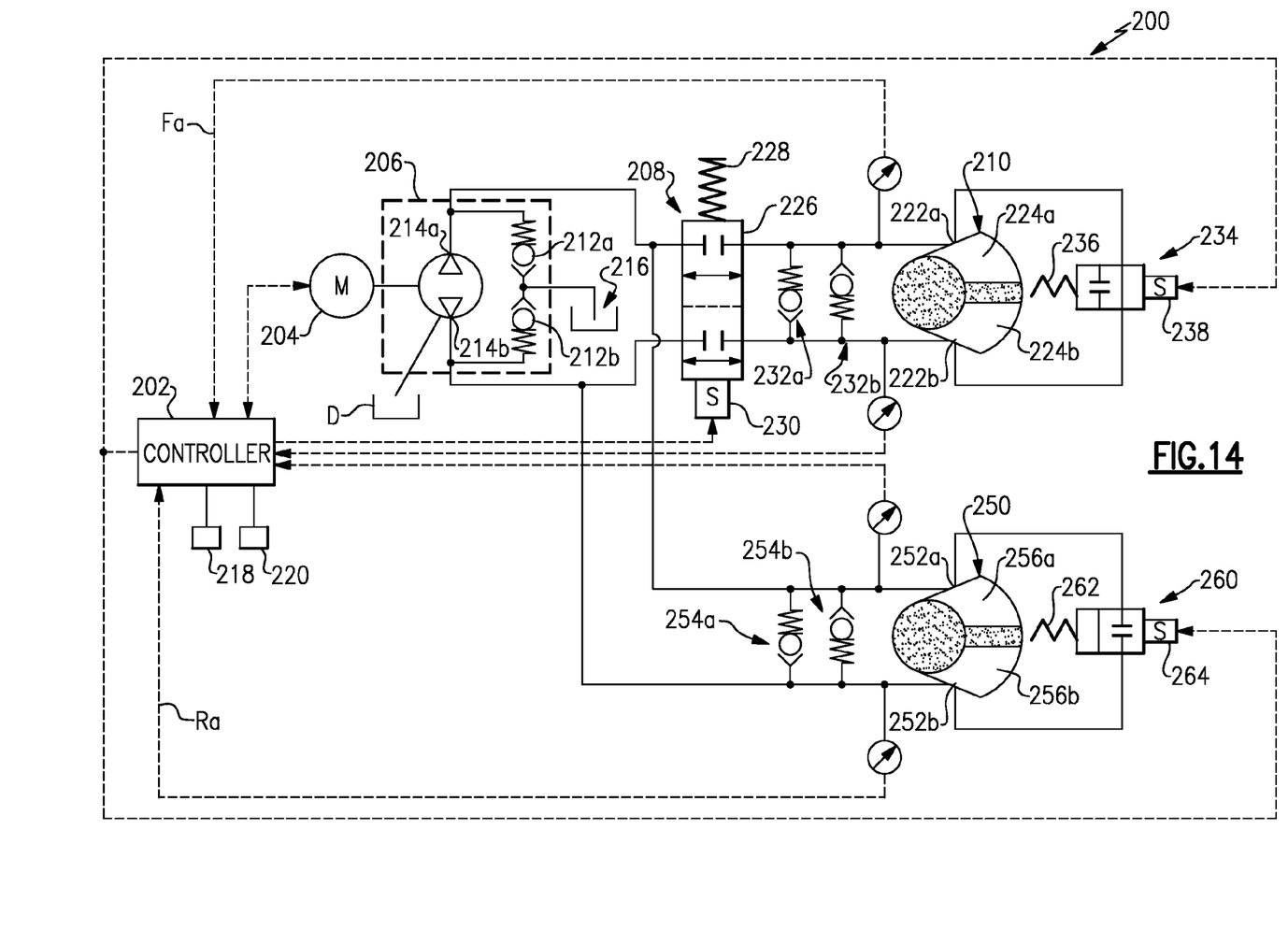
FIG. 14 is a schematic view representative of a seventh example roll control device.

FIG. 14 shows an example similar to that of FIG. 13 but which includes a dual axle configuration with a single channel bi-directional servo pump and rotary actuator. FIG. 14 shows an active roll control device 200 that can be used for a front axle Fa and a rear axle Ra. The roll control device 200 includes a controller 202, a servo motor 204, a bi-directional pump 206, a failsafe valve 208, and an actuator 210. The bi-directional pump 206 includes valves 212a, 212b that are respectively associated with output ports 214a, 214b of the pump 206, and which are connected to a reservoir 216. The pump 206 also includes a case drain D. The drain D acts as a control orifice that allows expanding fluid due to temperature increases to bleed back into the reservoir. The pump 206, valves 212a, 212b, and servo motor 204 are utilized in conjunction with the controller 202 to control roll control for the front axle Fa via the actuator 210.

As discussed above, inputs 218 and a roll sensor 220 are in communication with the controller 202, which are utilized with one or more algorithms to determine a desired roll stability based upon the inputs 218. The controller 202 commands the motor 204 using a desired roll stability signal to achieve a desired force, pressure or torque within the device that corresponds to the desired roll stability.

The actuator 210 operates with valves 212a, 212b, and the failsafe valve 208 in a manner similar to that described above with regard to FIG. 13. For example, the controller 202 issues a command or controlling signal to the motor 204 to drive the pump 206, which continuously provides fluid at instantly desired differential pressure values, for example, to ports 222a and 222b of the actuator 210. The ports 222a, 222b are associated with first and second chambers 224a, 224b of the actuator 210. The differential pressure transfers fluid between the first and second chambers 224a, 224b to increase the differential roll force at one wheel relative to the other wheel for the front axle Fa.

As in the configuration set forth in FIG. 13, the failsafe valve 208 for the two axle configuration of FIG. 14 is arranged between the pump 206 and pressure relief valves 232a, 232b and/or the actuator 210. The failsafe valve 208 includes a valve 226, spring 228, and solenoid 230. The failsafe valve 208 is in a normally closed position and is moved to an open position by sending a signal to solenoid 230 to provide a force to overcome the spring 128.

Additional pressure relief valves 232a, 232b are also incorporated into the roll control device 200. The pressure relieve valves are associated with the output ports 214a, 214b of the pump 206 and with the ports 222a, 222b of the actuator 210. Also included in the roll control device is a cross-link valve 234 that is biased to a normally closed position by a spring 236.

In one example, the controller 202 sends a command signal to a solenoid 238 which moves the valve 234 from the normally closed position to an open position by overcoming the spring 236. The cross-link valve 234 is fluidly connected to the ports 222a, 222b of the actuator 210. When open, fluid can flow between the chambers 224a, 224b.

In the example of FIG. 14, the roll control device 120 includes a second rotary actuator 250 for the rear axle Ra. The second rotary actuator 250 includes ports 252a, 252 that are coupled to output ports 214a, 214b of the pump 206. Pressure relief valves 254a, 254b are also in fluid communication with the ports 252a, 252b of the rotary actuator 250 and the output ports 214a, 214b of the pump 206.

Also included in the roll control device 200 is a second cross-link valve 260 that is biased to a normally open position by a spring 262. This is to create a failsafe understeer situation as discussed above; however, the valve could also be set to have a normally closed position. When open, fluid can flow between chambers 256a, 256b of the second rotary actuator 250. The cross-link valve 260 is fluidly connected to the ports 252a, 252b of the second rotary actuator 250. In one example, the controller 202 sends a command signal to a solenoid 264 which moves the valve 260 from the normally open position to a closed position by overcoming the spring 262. When closed, the fluid is prevented from flowing between the chambers 256a, 256b and the associated stabilizer becomes essentially hydrostatically locked as described above. The cross-link valve 260 is closed when a roll control torque is desired but is kept open during straight driving or low lateral g maneuvers. Closing the valve allows torque generation that improves vehicle handling. Opening the valve allows the left and right wheels to be decoupled. Isolating each wheel is highly desirable for ride improvements.

Figure 15:
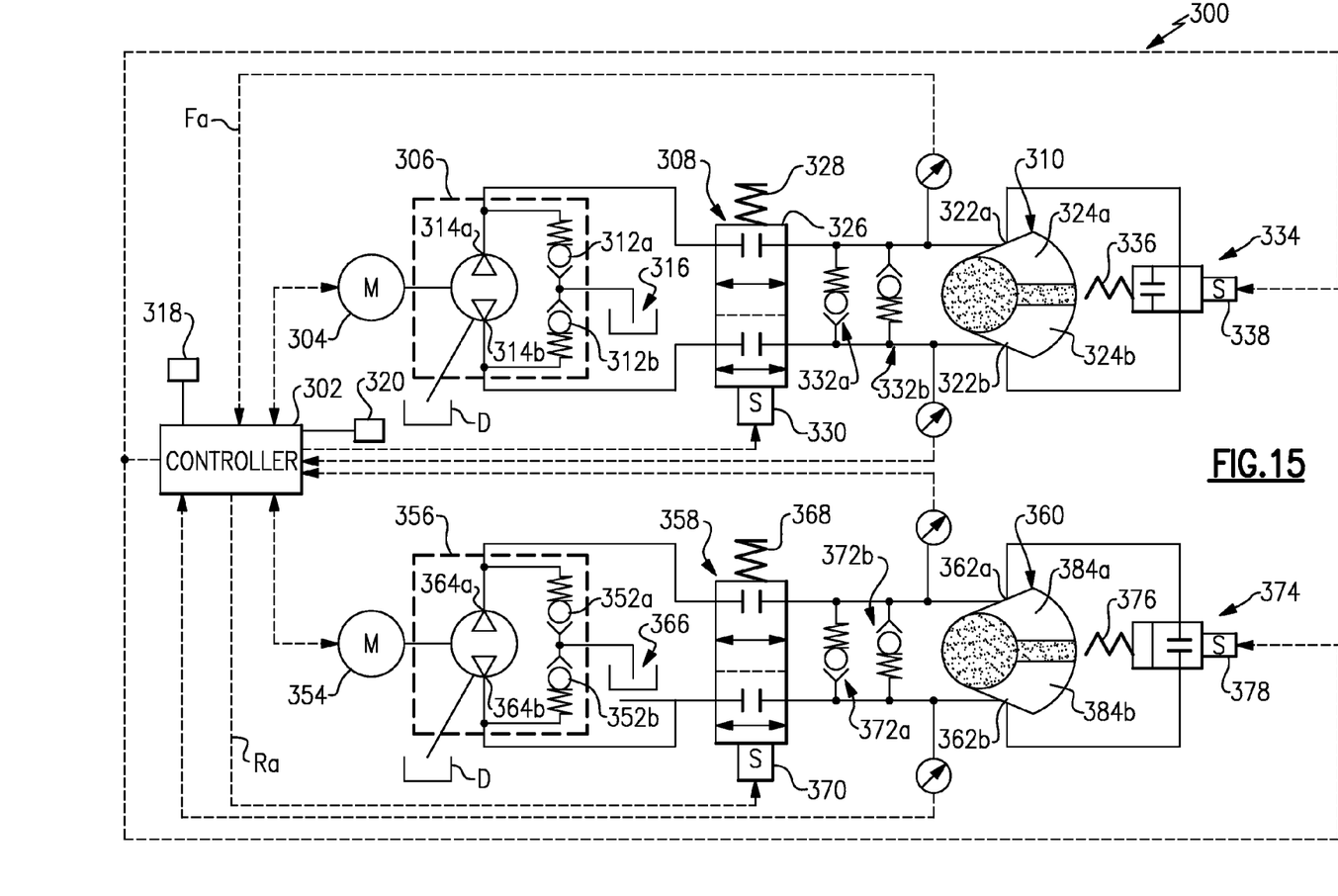
FIG. 15 is a schematic view representative of an eighth example roll control device.

FIG. 15 shows an example of a roll control actuator 300 that is for a front axle Fa and rear axle Ra, and which is configured as a dual channel bi-directional servo pump with rotary actuator. The roll control device 300 includes a controller 302, a first servo motor 304, a first bi-directional pump 306, a first failsafe valve 308, and a first actuator 310. The first bi-directional pump 306 includes first valves 312a, 312b that are respectively associated with output ports 314a, 314b of the first pump 306, and which are connected to a first reservoir 316. The first pump 306 also includes a case drain D. The drain D acts as a control orifice that allows expanding fluid due to temperature increases to bleed back into the reservoir. The first pump 306, valves 312a, 312b, and first servo motor 304 are utilized in conjunction with the controller 302 to control roll control for the front axle Fa via the first actuator 310.

One or more inputs 318 are in communication with the controller 302. As discussed above, the inputs 318 can include vehicle speed, wheel angle and other parameters that contribute to vehicle stability. The controller 302 includes one or more algorithms that determine a desired roll stability based upon the inputs 318. The controller 302 commands the first motor 304 using a desired roll stability signal to achieve a desired force, pressure or torque within the device that corresponds to the desired roll stability.

The first actuator 310 cooperates with a roll control stabilizer, which is provided between wheels of a vehicle as discussed above. The first pump 306 and valves 312a, 312b fluidly couple the output ports 314 or 314b of the first pump 306 to the first reservoir 316 in the different positions as described above.

A roll sensor 320 is in communication with the controller 302 and senses a roll condition for which a roll signal is sent to the controller 302 to provide feedback for the device 300. The controller 302 controls the first actuator 310 to achieve a desired vehicle roll stability. More specifically, the first pump 306 delivers fluid to the first actuator 310 at a controlled differential pressure determined by instant polarity and values of torque, for example, delivered by the first motor 304 connected to the first pump 306 in response to control thereof by the controller 302. The controller 302 then actively controls the first motor 304 and the first pump 306 for providing desired differential pressure to the first actuator 310 in a closed-loop controlled manner.

In operation, the controller 302 issues a command or controlling signal to the first motor 304 to drive the first pump 306, which continuously provides fluid at instantly desired differential pressure values, for example, to ports 322a and 322b of the first actuator 310. The ports 322a, 322b are associated with first and second chambers 324a, 324b of the first actuator 310. The differential pressure transfers fluid between the first and second chambers 324a, 324b to increase the differential roll force at one wheel relative to the other wheel for the front axle Fa.

The first failsafe valve 308 is arranged between the pump 306 and the pressure relief valves 332a, 332b and/or the actuator 310. The first failsafe valve 308 includes a valve 326 biased to a normally closed position by a spring 328, for example. The first failsafe valve 308 delivers fluid to the first actuator 310 at the controlled pressure determined by instant polarity and values of torque delivered by the first motor 304, for example. The first pump 306 can transfer fluid between the first and second chambers 324a, 324b of the first actuator 310 once a command signal from the controller 302 is sent to a solenoid 330, which moves the valve 326 from the normally closed position to an open position by overcoming the spring 328.

Additional pressure relief valves 332a, 332b are also incorporated into the roll control device 300 for the front axle Fa. The pressure relieve valves 332a, 332b are associated with the output ports 314a, 314b of the first pump 306 and with the ports 322a, 322b of the first actuator 310. Also included in the roll control device is a first cross-link valve 334 that is biased to a normally closed position by a spring 336.

In one example, the controller 302 sends a command signal to a solenoid 338 which moves the first cross-link valve 334 from the normally closed position to an open position by overcoming the spring 336. The first cross-link valve 334 is fluidly connected to the ports 322a, 322b of the first actuator 310. When open, fluid can flow between the chambers 324a, 324b of the first actuator 310 in an actively controlled manner.

In one example, failsafe conditions are implemented by the controller 302 via deactivating the controlling signal to the first pump 306 and the energizing signal to the first failsafe valve 308 whereby no fluid is pumped from the first pump 306. In the example, the first actuator 310 is additionally substantially hydrostatically locked as described above.

For the rear axle Ra, the roll control device also includes the controller 302, a second servo motor 354, a second bi-directional pump 356, a second failsafe valve 358, and a second actuator 360. Having a completely independent motor/pump for the second actuator is important as it allows the roll couple distribution to be completely independent. There no longer is a constraint of a "less than or equal to" differential pressure constraint such as that shown in FIG. 8, 10, or 11. Under and over steer conditions can now be more precisely controlled. The second bi-directional pump 356 includes second valves 352a, 352b that are respectively associated with output ports 364a, 364b of the second pump 356, and which are connected to a second reservoir 366. The second pump 356 also includes a case drain D. The drain D acts as a control orifice that allows expanding fluid due to temperature increases to bleed back into the reservoir. Further, while separate first 316 and second 366 reservoirs are shown, a common reservoir could also be used. The second pump 356, valves 352a, 352b, and second servo motor 354 are utilized in conjunction with the controller 302 to control roll stability for the rear axle Ra via the second actuator 360.

As discussed above, the controller 302 includes one or more algorithms that determine a desired roll stability based upon the inputs 318. The controller 302 commands the second motor 354 using a desired roll stability signal to achieve a desired force, pressure or torque within the device that corresponds to the desired roll stability.

The second actuator 360 cooperates with a roll control stabilizer for a rear axle Ra as discussed above. The second pump 356 and valves 352a, 352b fluidly couple the output ports 364 or 364b of the second pump 356 to the second reservoir 366 in the different positions as described above.

The roll sensor 320 is in communication with the controller 302 and senses a roll condition for which a roll signal is sent to the controller 302 to provide feedback for the device 300. The controller 302 controls the motor which drives the pump to generate torque in the actuator, which in turn generates a desired auxiliary roll moment similar to that described above. Auxiliary roll moment is a moment generated across the vehicle by the roll bar. The controller 302 then actively controls the second motor 354 and the second pump 356 for providing desired differential pressure to the second actuator 360 in a closed-loop controlled manner.

In operation, the controller 302 issues a command or controlling signal to the second motor 354 to drive the second pump 356, which continuously provides fluid at instantly desired differential pressure values, for example, to ports 362a and 362b of the second actuator 360. The ports 362a, 362b are associated with first and second chambers 384a, 384b of the second actuator 360. The pump 356 transfers fluid between the first and second chambers 384a, 384b and differential pressure (torque) is developed as a result. Because it is torque, the force generated by the system at the wheel is equal and opposite.

The second failsafe valve 358 is arranged between the pump 356 and the pressure relief valves 372a, 374b and/or the actuator 360. A second failsafe valve may or may not be needed depending on the vehicle characteristics desired in the failsafe mode. In this example, the second failsafe valve 358 includes a valve biased to a normally closed position by a spring 368, for example. The second pump 356 can transfer fluid between the first and second chambers 384a, 384b of the second actuator 360 once a command signal from the controller 302 is sent to a solenoid 370, which moves the valve 358 from the normally closed position to an open position by overcoming the spring 368.

Additional pressure relief valves 372a, 372b are also incorporated into the roll control device 300 for the front axle Fa. The pressure relieve valves 372a, 372b are associated with the output ports 364a, 364b of the second pump 356 and with the ports 362a, 362b of the second actuator 360. Also included in the roll control device is a second cross-link valve 374 that is biased to a normally open position by a spring 376. Optionally, a normally closed position could be provided if needed as discussed above.

In one example, the controller 302 sends a command signal to a solenoid 378 which moves the second cross-link valve 374 from the normally open position to a closed position by overcoming the spring 336. The second cross-link valve 374 is fluidly connected to the ports 362a, 362b of the second actuator 360. When open, fluid can flow between the chambers 384a, 384b of the second actuator 360 in an actively controlled manner.

In one example, failsafe conditions are implemented by the controller 302 via deactivating the controlling signal to the second pump 356 and the energizing signal to the second failsafe valve 358 whereby no fluid is pumped from the second pump 356. In the example, the second actuator 360 is additionally substantially hydrostatically locked as described above.

In the example of FIG. 15, a single controller 302 is used to independently control first 310 and second 360 actuators for front Fa and rear Ra axles. The roll control device 300 for the front and rear axles includes two separate systems each having a motor, pump, failsafe valve, etc. that operates independently of the other system. While a single controller is beneficial from a cost perspective, each system could be controlled by a separate controller.

It should be understood that while the examples discussed above are generally directed to two systems per vehicle or one powerpack per axle, any number of powerpacks with any number of actuators could be utilized to provide desired roll and stability control.

Although example embodiments have been disclosed, a worker of ordinary skill in this art would recognize that certain modifications would come within the scope of the claims. For that reason, the following claims should be studied to determine their true scope and content.

What is claimed is:

1. A roll control device comprising:
   at least first and second actuators that each have first and second chambers, and each of the first and second actuators having a first inlet port to the first chamber and a second inlet port to the second chamber;
   at least one pump including at least a first outlet port fluidly connected to the first inlet port to the first chamber and a second outlet port fluidly connected to the second inlet port to the second chamber, and wherein the first outlet port is fluidly connected to a first valve and the second outlet port fluid connected to a second valve, the first and second valves being fluidly connected to a reservoir;
   at least one failsafe valve downstream of the pump and upstream of the actuator;
   at least first and second pressure relief valves associated with the first and second outlet ports of the pump and associated with the first and second inlet ports of the first actuator, and wherein the first and second pressure relief valves are positioned downstream of the failsafe valve and upstream of the first actuator;

at least third and fourth pressure relief valves associated with the first and second outlet ports of the pump and associated with the first and second chambers of the second actuator;

at least a first cross-link valve that fluidly connects the first and second chambers of the first actuator and a second cross-link valve that fluidly connects the first and second chambers of the second actuator;

at least one motor connected to the pump; and a controller configured to command the motor to drive the pump and to control the failsafe and the first and second cross-link valves to transfer fluid between the first and second chambers of the first actuator and between the first and second chambers of the second actuator to change differential roll force associated with at least one of the first and second chambers to achieve a desired roll stability condition.

2. The roll control device according to claim 1 wherein the at least one pump comprises at least first and second pumps, and the at least one motor comprises first and second motors, and wherein the first motor drives the first pump to vary fluid flow within the first actuator and the second motor independently drives the second pump to vary fluid flow within the second actuator.

3. The roll control device according to claim 2 wherein the controller comprises a common controller that controls operation of the first and second motors and the first and second pumps.

4. The roll control device according to claim 2 wherein the first motor, the first pump and the first actuator are used to control roll stability for a first axle, and wherein the second motor, the second pump, and the second actuator are used to independently control roll stability for a second axle.

5. The roll control device according to claim 2 wherein the first and second pumps are each a bidirectional pump having first and second outlet ports respectively in fluid communication with first and second chambers of the respective first and second actuators, and wherein the controller commands the first and second motors to drive the first and second pumps in a desired direction.

6. The roll control device according to claim 2 comprising a first stabilizer connected to the first actuator and a second stabilizer connected to the second actuator and wherein roll characteristics are independently controlled between the first and second stabilizers.

7. The roll control device according to claim 6 wherein the first stabilizer comprises a first bar connected between a first pair of laterally spaced wheels and the second stabilizer comprises a second bar connected between a second pair of laterally spaced wheels.

8. The roll control device according to claim 1 wherein the at least one pump comprises only one pump, the at least one motor comprises only one motor, and wherein the motor drives the pump to vary fluid flow within the first actuator and the second actuator.

9. The roll control device according to claim 8 wherein the first and the second chambers of the first and second actuators are each respectively in fluid communication with the first and second outlet ports of the pump.

10. The roll control device according to claim 9 wherein the failsafe valve is in communication with the pump and acts to prevent transfer of fluid between first and second chambers of the first actuator in response to a failsafe condition, and wherein the second actuator is in communication with the pump upstream of the failsafe valve.

11. The roll control device according to claim 8 wherein the motor, the pump and the first actuator are used to control roll for a first axle, and wherein the motor, the pump, and the second actuator are used to independently control roll for a second axle.

12. The roll control device according to claim 8 wherein the pump is a single channel bidirectional pump having the first and second outlet ports respectively in fluid communication with the first and second chambers of the first actuator, and respectively in fluid communication with first and second chambers of the second actuator, and wherein the controller commands the motor to drive the pump in a desired direction.

13. The roll control device according to claim 8 comprising a first stabilizer connected to the first actuator and a second stabilizer connected to the second actuator and wherein roll characteristics are independently controlled between the first and second stabilizers.

14. The roll control device according to claim 1 including a second motor driving a second pump to control the second actuator, and including a second failsafe valve positioned downstream of the second pump and upstream of the third and fourth pressure relief valves.

15. A roll control device comprising:

at least first and second actuators each having first and second chambers;

a first cross-link valve in communication with first and second chambers in the first actuator and a second cross-link valve in communication with first and second chambers in the second actuator;

at least first and second pumps, wherein the first pump is fluidly connected between the first and second chambers of the first actuator and the second pump is fluidly connected between the first and second chambers of the second actuator;

a first failsafe valve positioned upstream of the first actuator and downstream of the first pump and a second failsafe valve positioned upstream of the second actuator and downstream of the second pump, and wherein the first failsafe valve is in communication with the first pump and acts to prevent transfer of fluid between first and second chambers of the first actuator in response to a failsafe condition, and wherein the second failsafe valve is in communication with the second pump and acts to prevent transfer of fluid between first and second chambers of the second actuator in response to a failsafe condition;

at least first and second motors respectively connected to the first and second pumps wherein the first motor drives the first pump to vary fluid flow within the first actuator and the second motor independently drives the second pump to vary fluid flow within the second actuator; and a controller configured to command the motor to drive the pump in response to a desired roll stability signal for transferring fluid between the first and second chambers to change differential roll force associated with at least one of the first and second chambers.

16. The roll control device according to claim 15 wherein the first and second failsafe valves are normally closed, the first cross-link valve is normally closed, and the second cross-link valve is normally open.

17. A roll control device comprising:

at least first and second actuators each having first and second chambers, and wherein each first chamber has a first inlet port and each second chamber has a second inlet port;

only one pump that includes at least a first outlet port fluidly connected to the first inlet ports of the first and second actuators and a second outlet port fluidly connected to the second inlet ports of the first and second actuators;

at least one failsafe valve downstream of the pump and upstream of the first actuator, the failsafe valve being in communication with the pump and acting to prevent transfer of fluid between the first and second chambers of the first actuator in response to a failsafe condition, and wherein the second actuator is in communication with the pump upstream of the failsafe valve;

a first cross-link valve that fluidly connects the first and second chambers of the first actuator;

a second cross-link valve that fluidly connects the first and second chambers of the second actuator, and wherein the failsafe valve is normally closed, the first cross-link valve is normally closed, and the second cross-link valve is normally open;

only one motor connected to the pump to drive the pump to vary flow within the first and second actuators; and a controller configured to command the motor to drive the pump and to control the failsafe and cross-link valves to transfer fluid between the first and second chambers to change differential roll force associated with at least one of the first and second chambers to achieve a desired roll stability condition.

* * * * *